United States Patent [19]
Chang et al.

[11] Patent Number: 4,901,570
[45] Date of Patent: Feb. 20, 1990

[54] RESONANT-BRIDGE TWO AXIS MICROACCELEROMETER

[75] Inventors: Shih-Chia Chang, Bloomfield Hills; David B. Hicks, Farmington Hills; Michael W. Putty, East Detroit, all of Mich.

[73] Assignee: General Motors Corporation, Detroit, Mich.

[21] Appl. No.: 304,057

[22] Filed: Jan. 30, 1989

Related U.S. Application Data

[63] Continuation-in-part of Ser. No. 274,180, Nov. 21, 1988, abandoned.

[51] Int. Cl.$^4$ ............................................. G01P 15/10
[52] U.S. Cl. ........................... 73/517 AV; 73/DIG. 1
[58] Field of Search .................... 73/517 AV, DIG. 1

[56] References Cited

U.S. PATENT DOCUMENTS

| | | | |
|---|---|---|---|
| 3,382,724 | 5/1968 | Wilcox . | |
| 3,541,866 | 11/1970 | Mathey et al. | 73/517 AV |
| 4,517,841 | 5/1985 | Peters et al. | 73/517 AV |
| 4,699,006 | 10/1987 | Boxenhorn | 73/517 AV |
| 4,748,848 | 7/1988 | Scholl et al. | 73/517 B |
| 4,805,456 | 2/1989 | Howe et al. | 73/517 AV |

Primary Examiner—Hezron E. Williams
Assistant Examiner—Robert P. Bell
Attorney, Agent, or Firm—Domenica N. S. Hartman

[57] ABSTRACT

A resonant bridge two-axis microaccelerometer is disclosed comprising polysilicon resonant bridges orthogonally attached to a silicon proof mass, such that the silicon proof mass is suspended by the resonant bridges. Acceleration in the plane of the substrate causes differential axial loads on the opposing microbridges in each pair, thereby shifting their resonant frequencies. The acceleration component aligned with a pair is measured by the difference in resonant frequencies.

17 Claims, 4 Drawing Sheets

RESONANT-BRIDGE TWO AXIS MICROACCELEROMETER

This is a continuation-in-part of U.S. Ser. No. 274,180 filed on Nov. 21, 1988 now abandoned.

FIELD OF THE INVENTION

This invention relates to sensors of the accelerometer type. More particularly, this invention relates to a two-axis silicon microaccelerometer consisting of preferably two pairs of polysilicon resonant bridges.

BACKGROUND OF THE INVENTION

An accelerometer is one of the major sensors used in navigational systems, particularly inertial navigational systems, and on-board automotive safety control systems. Automotive examples of accelerometer use include various anti-lock braking systems, active suspension systems, and seat belt lock-up systems.

More generally, an accelerometer is a device which measures acceleration and, in particular, an accelerometer measures the force that is exerted when a moving body changes velocity. The moving body possesses inertia, which tends to resist the change in velocity. It is this resistance to a sudden change in velocity that is the origin of the force which is exerted by the moving body, and which is proportional to the acceleration component in the direction of the movement, when the moving body is accelerated.

In a typical accelerometer, a mass is suspended by two springs attached to opposite sides of the mass. The mass is maintained in a neutral position so long as the system is at rest or is in motion at a constant velocity. When the system undergoes a change in velocity in the direction of the springs, axis, and therefore is accelerated in that direction, the spring mounted mass will at first resist the movement because of its inertia. Therefore, this resistance to the movement, or delay, will force one of the springs to be stretched and the second to be compressed. The force acting on each spring is equal, yet opposite, in magnitude and is equal to the product of the weight of the mass and the acceleration of the mass. The acceleration which is determined is the change in velocity experienced by the mass.

Microaccelerometers having resonant microbridges are also known. An example of this type of accelerometer is disclosed in U.S. Patent application Ser. No. 052,026 to Howe et al., entitled, "Resonant Accelerometer." In a microaccelerometer of this type, a proof mass is suspended by at least one pair of resonant microbridges. The pair of resonant microbridges are attached to opposite ends of the proof mass along a common axis. This type of resonant microaccelerometer is attractive for precision measurements because the frequency of a micromechanical resonant structure can be made highly sensitive to physical or chemical signals.

In a microaccelerometer based on resonant microbridges, the acceleration in the plane of the substrate causes differential axial loads on oppositely disposed resonant microbridges, i.e., causes one supporting resonant bridge to be in compression and the other in tension. It is the inertial force of the proof mass which generates the axial load on the resonant microbridges. In turn, the compressive and tensile loads shift the inherent resonant frequencies for each resonant microbridge. The difference between the resonant frequencies of the compressive and tensile members is measured and used to determine the magnitude of the acceleration component in the direction of the common axis shared by the pair of resonant microbridges.

A shortcoming of the above-identified U.S. patent application Ser. No. 052,026 is that the accelerometer is not as durable or rugged as is preferred for automotive applications. In particular, the drive and sense electrodes, which maintain the microbridges at their respective resonant frequency and sense the changes in their resonant frequency when the microbridge is axially loaded, are cantilevered silicon beams which extend over and above the resonant microbridges. Therefore, the cantilevered electrodes are extremely fragile and susceptible to damage. It would be preferable to alleviate the cantilevered electrodes and form the electrodes so that they are integral with the supporting solid silicon substrate of the microaccelerometer. This arrangement would eliminate vibration of the drive and sense electrodes and therefore extend the life of these components and increase the accuracy of the sensor. In addition, this arrangement would reduce the complexity of the fabrication process.

Another shortcoming of the resonant bridge microaccelerometer disclosed in U.S. Ser. No. 052,026 is that the resonant bridges, which suspend the proof mass, are formed from single crystal silicon doped with boron. This material causes the resonant bridges to be under an inherent tensile stress. It would be advantageous to form the resonant bridges in such a manner so as to result in the bridges being optimally stress-free or under minimal compressive stresses.

In addition, for this type of microaccelerometer, it is desirable to limit the displacement of the proof mass in the direction perpendicular to the proof mass. Generally, this type of microaccelerometer has two pairs of resonant bridges, each member of the pair located along a common axis through the proof mass and each pair located along a perpendicular axis with respect to the other pair. Therefore, for convenience of description, the resonant bridges are typically located along an x and y axis through the proof mass, and measure acceleration in those directions. If acceleration is not being measured in the third direction perpendicular to the proof mass, i.e., the z-axis direction, it is desirable to limit the displacement of the proof mass in that z-axis direction, so as to maximize the life of the device and so as to minimize any detrimental effects this z-directional displacement has on the x and y axis measurements. The current resonant microaccelerometer does not provide a means for limiting this z-directional displacement.

Although there are several different types of accelerometers currently available commercially, they are generally typified by the same problems, in addition to those shortcomings particular to the above-described structure. First, an x-direction acceleration signal is often affected by y- or z-direction acceleration and vice versa, or by non-signal motions. Second, a change in temperature may induce stress variation and hence cause inaccurate measurements. Lastly, the current accelerometers are characterized by extremely high cost to produce without the requisite long life durability for highly rugged applications such as in an automotive environment.

Current accelerometers are unable to meet the requirements of reliability, accuracy, ruggedness, and low cost, all characteristics which are required for on-board automotive systems, as well as other applications. Therefore, it is desirable to provide a resonant-bridge microaccelerometer which alleviates the above-mentioned detriments, in particular by providing drive and sense electrodes which are integral with the supporting substrate, resonant bridges which are inherently stress-free or under a minimal compressive stress, and further, means for limiting the z-directional displacement of the proof mass.

SUMMARY OF THE INVENTION

It is an object of the present invention to provide a resonant bridge accelerometer.

It is a further object of the present invention that such a resonant bridge accelerometer utilize integrated circuitry and micromachining techniques.

Lastly, it is still a further object that such an accelerometer be rugged, durable and amenable to automotive production techniques.

In accordance with a preferred embodiment of this invention, these and other objects and advantages are accomplished as follows.

An accelerometer of the present invention comprises a proof mass suspended by at least a pair of resonant bridges. A first end of each pair member bridge is attached to opposite sides of the proof mass. The opposite second end of each pair member is attached to a common supporting substrate. The bridges are integrally attached to both the proof mass and supporting substrate. Members of the bridge pairs are longitudinally aligned with each other to form an axis through opposite sides of the proof mass.

Each bridge member is formed in such a manner so as to be optimally stress-free or under a minimal compressive loading, and is excited to vibrate at its respective resonant frequency. Acceleration of the proof mass and support causes a symmetrical compression and tension in the pair of resonant bridges along a common axis, which results in a change of the inherent resonant frequency for each bridge. This effect correspondingly produces a change in the difference between the resonant frequencies for each member of the bridge pair. The magnitude of this change in difference between resonant frequencies in a bridge pair is measured by a signal processing circuit and corresponds to the acceleration of the proof mass along the axis formed by the respective bridge pair.

In a preferred embodiment, a second pair of resonant bridges are similarly attached to opposite sides of the proof mass and form a second axis which is perpendicular to the axis formed by the first pair of resonant bridges. Again, each bridge is excited to vibrate at its respective resonant frequency, and the magnitude of the difference in resonant frequency between the members of each pair due to the acceleration is then measured to provide an indication of acceleration along the axis formed by the respective pair of bridges.

In the preferred embodiment, orthogonal components of acceleration are simultaneously measured, one along the axis formed by the first pair of bridges, and the other along the axis formed by the second pair of bridges. The signal processing circuit includes a frequency-measuring circuit for each bridge, preferably in the form of a single drive electrode and two sense electrodes which are integral with the supporting substrate. The drive and sense electrodes are provided across a gap from their corresponding bridge, the bridge spanning over and across the drive and sense electrodes. The frequency measuring circuit for each bridge is connected to a feedback circuit, which results in an output signal corresponding to the change in difference between frequencies for each respective pair of bridges. From this output, the acceleration undergone by the mass along the axis defined by each bridge pair may be determined.

An inventive feature of the preferred accelerometer is that the drive and sense electrodes are integrally attached to the supporting substrate across a gap from the resonant bridge which spans over and across the electrodes. With this preferred placement of the drive and sense electrodes and resonant bridge, the durability and reliability of the accelerometer is greatly enhanced.

The preferred embodiment of this accelerometer also includes means for limiting the displacement of the proof mass in a direction orthogonal to the two axis defined by the resonant bridge pairs through the proof mass. Preferably, the means for limiting this displacement comprise mechanical cantilevered stoppers disposed so as to prevent undesired positive and negative displacement in that direction. In addition, the preferred embodiment also comprises means for preventing unnecessary rotational movement of the mass.

Other objects and advantages of this invention will be better appreciated from a detailed description thereof, which follows.

DETAILED DESCRIPTION OF THE INVENTION

A resonant bridge microaccelerometer is disclosed which measures the components of acceleration in the plane of the silicon substrate. In a preferred embodiment, this invention comprehends a two-axis silicon microaccelerometer comprising two pairs of polysilicon resonant bridges, which are optimally stress-free or under minimal compressive stresses, and which are orthogonally attached to a silicon proof mass. In order to cancel temperature and material effects to first order, the resonant bridge elements which are attached to opposite sides of the proof mass are matched, such that they experience differential axial loads during acceleration. The inertial force on the proof mass, due to acceleration in the plane of the substrate, generates the differential axial loads on the opposing resonant microbridges in each pair thereby shifting their resonant frequencies.

The acceleration component aligned with a microbridge pair is measured by determining the difference in resonant frequencies between each member of the pair. This measurement is accomplished by utilizing drive and sense electrodes which are fabricated in the solid silicon supporting substrate, and positioned across a gap from their corresponding resonant microbridge. To suppress displacement of the mass in the direction orthogonal to the supporting substrate, mechanical stoppers are provided to limit the orthogonal movement, while constraining bridges are provided on the opposite surface of the substrate to prevent rotational movement and reduce z-directional displacement.

Figure 1:
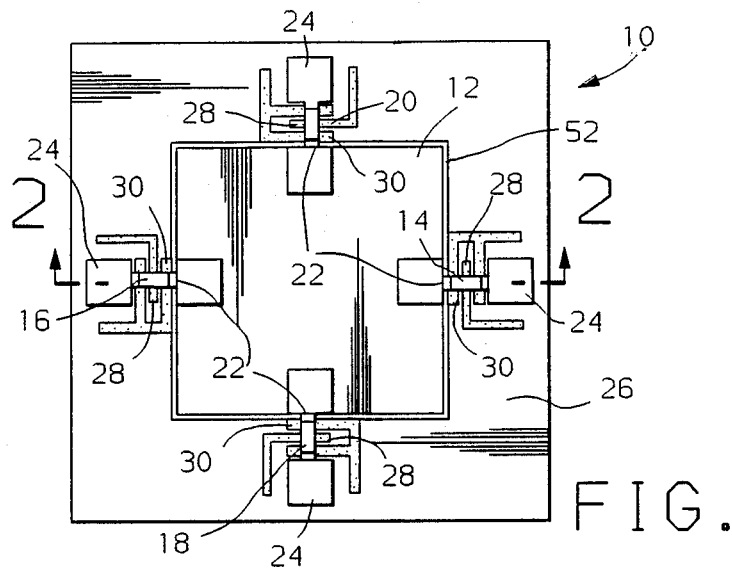
FIG. 1 is a plan view of a resonant bridge two-axis microaccelerometer made in accordance with a preferred embodiment of this invention.

The preferred microaccelerometer 10 is illustrated in plan view in FIG. 1. The proof mass 12 is preferably suspended by two pairs of matched resonant bridges (14, 16 and 18, 20), which are sustained in mechanical resonance by means of feedback amplifiers. An x-axis acceleration component, $a_x$, results in an inertial force, defined by the equation $F_i = -M a_x$, on the proof mass 12, which is predominantly shared by the resonant bridges aligned in the x-axis direction, which for illustrative purposes are resonant bridges 14 and 16. The acceleration in the x-axis direction causes one of these bridges 14 to be in compression and the other bridge 16 to be in tension, which causes a resulting shift in their resonant frequencies, $f_{x1}$ and $f_{x2}$.

An analysis based on Rayleigh's Energy Method, assuming the fundamental vibrational mode, leads to the following expression for the resonant frequency of that pair member in tension. For illustrative purposes, it will be assumed that resonant bridge 16 is in tension, therefore, $$F_{x2} = f_o \sqrt{1 + 0.293 \, (l^2 / E w t^3)(1/2 \, M \, a_x)},$$

where $f_o$ is the unperturbed resonant frequency, E is the Young's modulus of elasticity for the material and l, W, and t are the length, width and thickness of the resonant bridge, respectively. For simplicity, this result neglects any load-sharing by the bridges 18 and 20 provided in the orthogonal direction. By subtracting the corresponding expression for the member in compression, i.e., resonant bridge 14 in this example, and considering small perturbations, the difference in frequencies becomes:

$$\Delta f_x = f_{x2} - f_{x1} = (0.146 f_o M l^2 / E W t^3) \, a_x = S_x \, a_x,$$

where $S_x$ is defined as the sensitivity to x-axis acceleration components. From this analytical result, the x-axis acceleration component may be determined. In addition, the above relationships may be used to determine the y-axis component of acceleration also.

The z-axis component of acceleration, which is the axis orthogonal to the plane of the proof mass 12 or the x and y-axis, causes vertical displacement of the proof mass 12. For small vertical displacements, the resulting perturbations in $f_{x1}$ and $f_{x2}$, for the x-axis component, are common to both bridges 14 and 16 aligned along the x-axis, and is canceled in $\Delta f_x$. Additional mechanical restraint on the proof mass 12 is desirable to ensure only small vertical displacements over a practical range of acceleration in the z-axis direction.

As shown in FIG. 1, a preferred accelerometer 10 of the present invention comprises a proof mass 12 suspended by at least a pair of resonant bridges 14 and 16 or 18 and 20, preferably as shown, wherein two pairs of bridges 14, 16 and 18, 20 are aligned along both orthogonal axis through the proof mass. A gap 52 is provided everywhere therebetween the proof mass 12 and supporting substrate 26. A first end 22 of each pair member bridge is attached to opposite sides of the proof mass 12. The opposite second end 24 of each pair member is attached to a common supporting substrate 26. The bridges 14, 16, 18 and 20 are integrally attached to both the proof mass 12 and supporting substrate 26. Members of the bridge pairs 14, 16 and 18, 20 are longitudinally aligned with each other to form an axis through opposite sides of the proof mass 12. (An overlaying top layer of Silicon Nitride is not shown in FIG. 1 for clarity of the device.)

Each bridge member is formed in such a manner so as to be preferably under none or a minimal compressive loading, and is excited to vibrate at its respective resonant frequency. The resonant bridges 14, 16, 18 and 20 are preferably formed from polycrystalline silicon doped with phosphorus using standard semiconductor fabrication techniques. The stress in the resonant bridge (14, 16, 18 or 20) depends on the dopant species, dopant concentration, and the post-deposition heat treatment. With phosphorus dopant, the bridge (14, 16, 18 or 20) is generally under compressive stress. The resonant bridge (14, 16, 18 or 20) is heat treated to optimize, preferably minimize, the level of compressive stress within the bridge member.

Acceleration of the proof mass 12 and supporting substrate 26 causes a symmetrical compression and tension in the pair of resonant bridges 14, 16 and 18, 20 along a common axis, which results in a change of the inherent resonant frequency for each bridge (14, 16, 18 or 20). This effect correspondingly produces a change in the difference between the respective resonant frequencies of each member of the pair of bridges 14, 16 and 18, 20. The magnitude of this change in difference between resonant frequencies in a bridge pair 14, 16 and 18 20 is measured by a signal processing circuit and corresponds to the acceleration of the proof mass along the axis formed by the respective bridge pair.

In the preferred embodiment shown in FIG. 1, a second pair of resonant bridges 18, 20 are similarly attached to the proof mass 12 and form a second axis which is perpendicular to the axis formed by the first pair of resonant bridges 14, 16. The second pair of bridges 18, 20 are not necessary if only the acceleration component in one direction is sought to be determined. Again, each bridge (14, 16, 18 or 20) is excited to vibrate at its respective resonant frequency, and the magnitude of the difference in resonant frequency between the members of each pair 14, 16 and 18, 20 due to the acceleration is then measured to provide an indication of acceleration along the axis formed by the respective pair of bridges 14, 16 and 18, 20.

Figure 2:
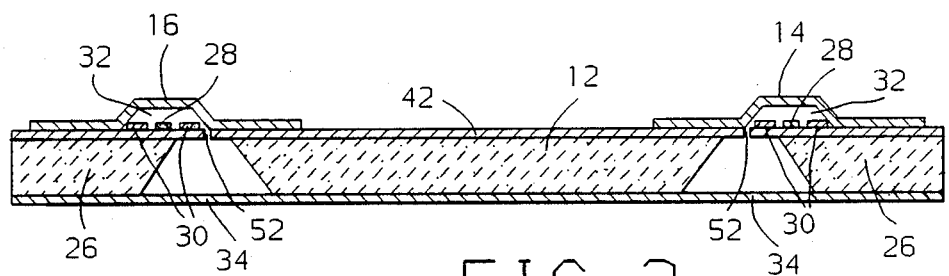
FIG. 2 is a cross-sectional view along the line 2—2 of the microaccelerometer shown in FIG. 1 wherein the resonant bridges span over and across the corresponding drive and sense electrodes which are integrally attached to the supporting substrate.

In the preferred embodiment, orthogonal components of acceleration are simultaneously measured, one component in the direction defined by the first pair of bridges 14, 16 along the x-axis direction, and the other along the y-axis direction formed by the second pair of bridges 18, 20. The signal processing circuit includes a frequency-measuring circuit for each bridge, preferably in the form of a single drive electrode 28 and two sense electrodes 30 which are integral with and formed in the solid silicon supporting substrate 26. It is advantageous to form the drive and sense electrodes, 28 and 30 respectively, in this manner because: (1) the drive and sense electrodes 28 and 30 do not vibrate and therefore do not unduly shorten the life of the device and concurrently improve sensor accuracy; and (2) the complexity of the processing steps is reduced. As shown in FIG. 2, the drive and sense electrodes 28 and 30 are provided across a gap 32 from their corresponding bridge (14, 16, 18 or 20), the bridge (14, 16, 18 or 20) spanning over and across the drive and sense electrodes 28 and 30.

Each resonant bridge (14, 16, 18 or 20) is electrostatically excited to its resonant frequency by its drive electrode 28. The two sense electrodes 30 corresponding to each bridge (14, 16, 18 or 20) are provided on opposite sides of the corresponding drive electrode 28 on the supporting substrate 26. The vibration of each bridge (14, 16, 18 or 20) generates a time-varying capacitance across its corresponding gap 32 from the drive and sense electrodes 28 and 30. The sense electrodes 30 sense any changes in the capacitance and thereby sense changes in the vibration of the bridge (14, 16, 18 or 20). The sense electrodes 30 are connected to a feedback circuit (not shown) which causes the drive electrode 28 to exert a force on the bridge (14, 16, 18 or 20) as a function of the sensed change in vibration to maintain vibration of the bridge (14, 16, 18 or 20) at its respective resonant frequency. The maximum amplitude of the bridge (14, 16, 18 or 20) vibration occurs when the bridge (14, 16, 18 or 20) is at resonance, which is when the frequency of the drive voltage coincides with the natural frequency of the bridge (14, 16, 18 or 20).

The frequency measuring circuit for each bridge is connected to a feedback circuit, which results in an output signal corresponding to the change in difference, or $\Delta f_x$ in the above equations, between frequencies for each respective pair of bridges 14, 16 and 18, 20. From this output, the acceleration undergone by the proof mass 12 along the axis defined by each bridge pair 14, 16 and 18, 20 may be determined.

An inventive feature of the preferred accelerometer 10 is that the drive and sense electrodes 28 and 30 are integrally attached to the supporting substrate 26 across a gap 32 from the resonant bridge (14, 16, 18 or 20) which spans over and across the electrodes 28 and 30, as shown in FIG. 2. With this preferred placement of the drive and sense electrodes 28 and 30 and resonant bridge (14, 16, 18 or 20), the durability and reliability of the accelerometer 10 is greatly enhanced.

As shown in FIG. 2, in the preferred embodiment of this accelerometer 10, constraining bridges 34 are also provided on the underside of the proof mass 12, which is the side opposite from the resonant bridges (14, 16, 18 or 20). The constraining bridges 34 not only eliminate rotational movement of the proof mass 12, but also suppress the z-directional displacement of the proof mass 12 due to z-directional acceleration.

Figure 3:
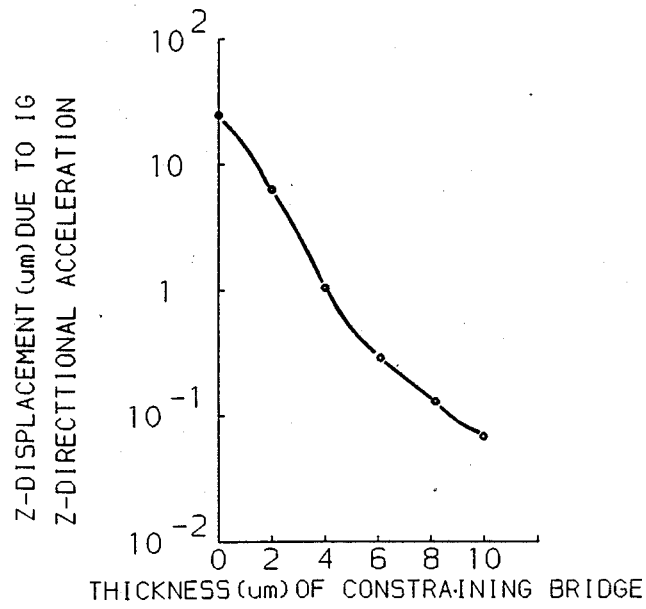
FIG. 3 is a graph depicting the Z-displacement of the mass due to 1G z-directional acceleration versus thickness of the constraining bridges.

FIG. 3 graphically illustrates the relationship between the z-directional displacement of the proof mass 12 due to 1 G z-directional acceleration, i.e., the relative sensitivity of the sensor 10, versus the thickness of the constraining bridge 34. By increasing the thickness of the constraining bridge 34, the z-displacement of the proof mass 12 is greatly reduced yet the sensitivity of the sensor 10 is only mildly reduced. The suppression of z-displacement is highly desirable since the suppression enhances the reliability, lifetime and accuracy of the sensor 10. The geometric dimensions of the constraining bridges 34 are therefore scaled so as to optimize the relationship between suppression of z-directional displacement, alleviation of rotational movement and loss in sensor 10 sensitivity.

Figure 4:
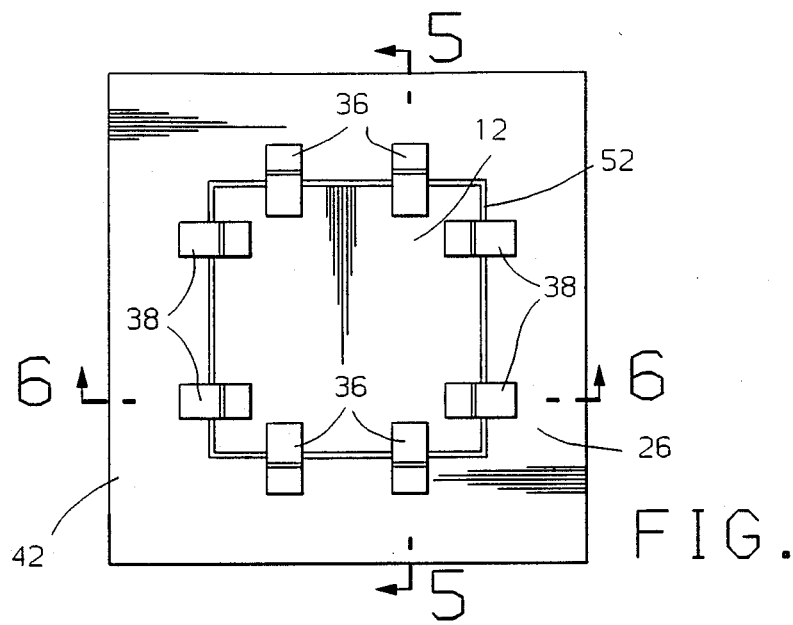
FIG. 4 is a plan view of the mechanical stoppers made in accordance with a preferred embodiment of this invention.

The preferred microaccelerometer 10 further comprises means for limiting the displacement of the proof mass 12 in a direction orthogonal, i.e., the z-axis, to the two axis defined by the resonant bridge pairs 14, 16 and 18, 20 through the proof mass 12. Preferably, the means for limiting this displacement comprise mechanical cantilevered stoppers 36 and 38 disposed so as to prevent undesired positive and negative displacement, respectively, in that z-axis direction of the proof mass 12, as shown in FIG. 4 without the resonant bridges (14, 16, 18 and 20) of the accelerometer 10. The mechanical stoppers 36 and 38 are formed from polysilicon and limit the upward and downward displacement of the proof mass 12, respectively.

Figure 5:
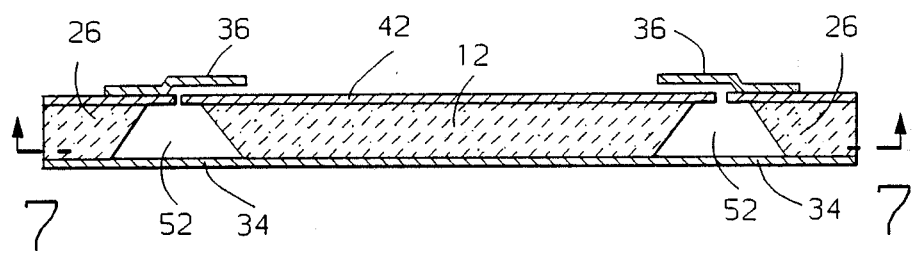
FIG. 5 is a cross-sectional view along the line 5—5 of the mechanical stoppers shown in FIG. 4 wherein these stoppers prevent z-directional displacement of the mass in a first direction.
Figure 6:
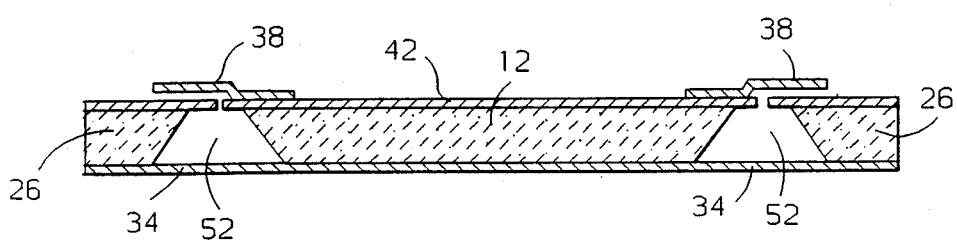
FIG. 6 is a cross-sectional view along the line 6—6 of the mechanic stoppers shown in FIG. 4 wherein these stoppers prevent z-directional displacement of the mass in a second direction.

FIG. 5 is a cross section of the mechanical stopper 36 along line 5—5 in FIG. 4 and illustrates the direction in which the cantilevered beam 36 extends so as to prevent unnecessary positive displacement of the proof mass 12. As shown in FIG. 5, the mechanical stopper 36 is attached to the substrate 26 and extends over the proof mass 12. FIG. 6 illustrates the mechanical stopper 38 which is attached to the proof mass 12 and extends over the substrate 26 so as to prevent any unnecessary negative displacement of the proof mass 12. The maximum displacement of the proof mass 12 is equal to the offset of the mechanical stopper 36 and 38. By adding the mechanical stoppers 36 and 38, the reliability and the durability of the accelerometer 10 are further improved.

This silicon resonant microaccelerometer 10 is fabricated using bulk and surface micromachining techniques. The device fabrication process utilizes orientation dependent silicon etching to form the proof mass 12 and other components. In addition, selective etching of oxide sacrificial layers is used to form the polysilicon microbridges (14, 16, 18 or 20).

Figure 7:
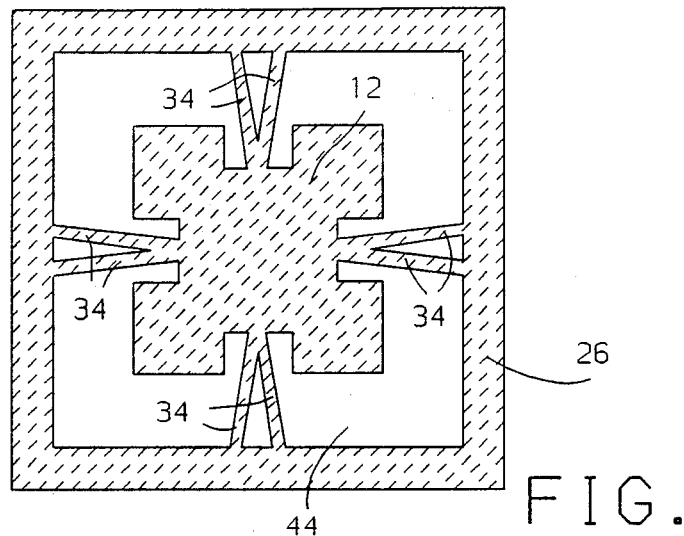
FIG. 7 is a plan view of the underside of the microaccelerometer shown in FIG. 1 made in accordance with a preferred embodiment of this invention.

In summary, the proof mass 12 is micromachined from the substrate 26 using an orientation-dependent etch. As shown in FIG. 7, on the backside of the silicon wafer 26, the same etching step yields preferably eight boron-doped silicon constraining bridges 34 which restrict rotational movement of the proof mass 12. In addition, the resonant bridges (14, 16, 18 and 20) are formed from a chemical vapor deposited (CVD) polycrystalline silicon thin film by underetching a CVD oxide spacer layer. Further, underlying polysilicon drive and sense electrodes 28 and 30, respectively, are used to excite the fundamental resonance of the bridge (14, 16, 18 or 20) and to detect its vibration, respectively. Cross sections 5—5 and 6—6 shown in FIGS. 5 and 6 illustrate cantilevers 36 and 38 which function as limit-stops for vertical displacement of the proof mass 12.

Therefore, using standard semiconductor fabrication techniques, the preferred fabrication sequence for this microaccelerometer 10 requires six masking steps.

Figure 8:
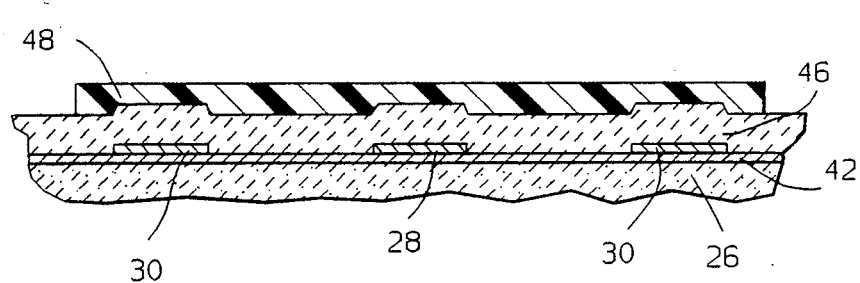
FIGS. 8—11 illustrate the preferred processing steps for forming the resonant bridge structure in accordance with a preferred embodiment of this invention.

The drive and sense electrodes 28 and 30, the resonant bridges (14, 16, 18 and 20) and the mechanical stoppers 36 and 38 are formed on top of a silicon nitride layer 42 which is approximately 1000 Angstroms thick. FIGS. 8–11 illustrate the processing steps required to form the resonant bridges (14, 16, 18 and 20) and gap 32 therebetween the resonant bridges (14, 16, 18 and 20) and drive and sense electrodes 28 and 30. The fabrication steps are identical for the formation fo the cantilevered mechanical stoppers 36 and 38, except that the resonant bridges (14, 16, 18 and 20) span the entire gap, whereas the stoppers 36 and 38 do not span over and extend to the opposite surface. The silicon nitride layer 42, as shown in FIG. 8, is formed on the front side surface of the silicon substrate 26.

After initial oxidation of the silicon wafer 26, boron etch-stop regions are formed on the front and back sides of the wafer 26 using a solid-source diffusion process. Thermal oxide is regrown on the boron-doped regions during the drive-in step. The drive and sense electrodes 28 and 30 are formed by patterning phosphorus-doped chemically vapor deposited polysilicon deposited on a layer of chemically vapor deposited silicon nitride 42. The drive and sense electrodes 28 and 30 are approximately 5000 Angstroms thick.

An annular window 44, as illustrated in FIG. 7, in the backside oxide film is then opened for etching the proof mass 12. In particular, the proof mass 12 is generated by orientation dependent wet chemical etching of the silicon substrate 26 using preferably ethylene diamine and pyrocatechol (EDP) which has been heated to about 105° C. as the etchant. The silicon substrate 26 is submerged in the etchant for about 4 hours. A mask having a square corner compensation scheme may be utilized to minimize the excessive corner etching; however, the proof mass 12 thus obtained is adequate but not ideal. In the current invention, the mask pattern is preferably modified to include a street corner compensation scheme and potassium hydroxide was used as the silicon etchant. A nearly perfect trapezoidal proof mass 12 was obtained. The perfect fourfold symmetry and the accurate dimensional control of the proof mass 12 facilitate and enhance the accuracy of the directional sense by the microaccelerometer 10.

During the silicon micromachining step, the front side of the wafer 26 is protected by a layer of CVD oxide. The EDP etch stops on the initial oxide layer in the bridge area, or on the front-side boron doped regions. The latter are included to provide improved front-to-back misalignment tolerance and an electrical ground plane. During later processing, the oxide masking and spacer layers are removed by a hydrofluoric acid etch undercutting the polysilicon bridges (14, 16, 18 and 20).

Figure 9:
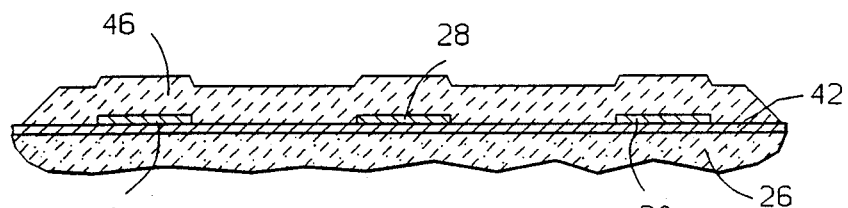

The resonant bridges (14, 16, 18 and 20) and cantilevered mechanical stoppers 36 and 38 are formed using the following preferred processing sequence, which is illustrated in FIGS. 8–11. A dual layer 46 preferably comprising phosphosilicate glass (PSG)/silicate glass (SG) with the thicknesses of approximately 0.4 micrometers and 1.6 micrometers, respectively, is deposited over the drive and sense electrodes 28 and 30 and underlying substrate 26 and proof mass 12, as shown in FIG. 8. The PSG/SG dual layer 46 is delineated using a photoresist layer 48 as shown in FIG. 8 by chemical etching in, preferably, buffered hydrofluoric acid for about 10–30 minutes, preferably about 18 minutes. With the dual layer 46 approach, a gradual step results in a PSG/SG pedestal 46, as shown in FIG. 9, is obtained after the buffered hydrofluoric acid etch.

Figure 10:
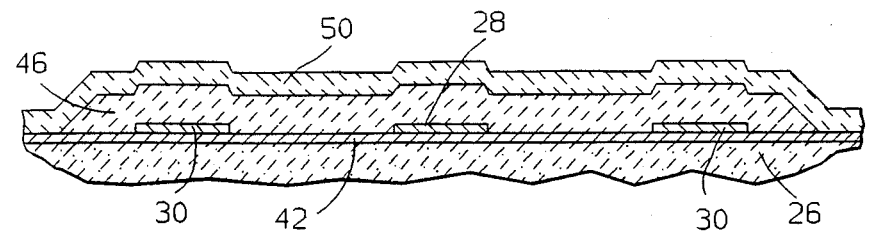
Figure 11:
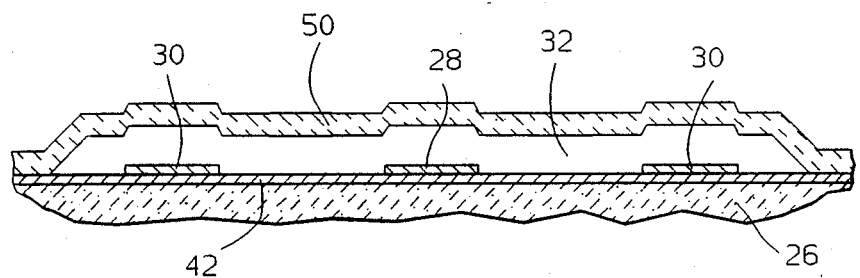

Another layer of polysilicon 50, which will subsequently form the resonant bridge (14, 16, 18 and 20) and the mechanical stopper 36 and 38 is then deposited, as shown in FIG. 10. This is followed by phosphorus doping and delineation to form the resonant bridge (14, 16, 18 or 20) and cantilevered structures 36 and 38. After high temperature annealing to reduce the inherent stress of the polysilicon layer 50 at approximately 1100° C. in flowing nitrogen gas for about one hour, the PSG/SG spacer layer 46 is etched by buffered hydrofluoric acid or hydrofluoric acid and rinsed away, to form the requisite gap 32 shown in FIG. 11 between the resonant bridge (14, 16, 18 or 20) and drive and sense electrodes 28 and 30, and the cantilevered mechanical stoppers 36 and 38.

The constraining bridges 34 shown in FIG. 7 are formed from the single crystal silicon wafer 26 doped with boron having a boron concentration greater than about $10^{20}$ centimeters$^{-3}$. The orientation dependent wet chemical etch was used to undercut the constraining bridge 34 structure using ethylene diamine and pyrocatechol or potassium hydroxide as the etchant. The angle between the constraining bridge 34 and the plane or edge of the proof mass 12 must be greater than:

$$\tan^{-1}(W/L_o)$$

where W and $L_o$ are the width and length of the constraining bridge 34, respectively, to ensure a complete undercut of the constraining bridge 34. As shown in FIG. 7, the optimum placement for the constraining bridges 34 is determined to be about 9 degrees between the pairs of constraining bridges 34.

The formation of the metal interconnect for the accelerometer (not shown) comprises the following preferred steps. Aluminum is the most commonly used interconnect material; however, aluminum is severely etched during the harsh etching processes required to form the proof mass 12 and polysilicon resonant bridges (14, 16, 18 and 20) and cantilevered structures 36 and 38. Three metallization schemes are utilized and preferred.

First, the interconnects may be formed from polysilicon doped with phosphorus. The polysilicon interconnect is formed at the same time the resonant bridge is formed. Since the polysilicon is susceptible to the ethylene diamine and pyrocatechol (EDP) etchant during the formation of the proof mass, a layer of silicate glass is deposited on the front side of the silicon wafer where the resonant bridge structure and interconnects are provided, prior to the EDP etchant which attacks the silicon from the backside to form the proof mass.

A second preferred mode is to use gold/silicon eutectic material as the metal interconnect. The gold/silicon eutectic material is formed by depositing about 2000 Angstroms of gold on top of the polysilicon, followed by heat treatment at 420° C. in dry nitrogen gas for about 15 minutes. The gold/silicon eutectic is preferable because it can withstand long etching in hydrofluoric acid and the ethylene diamine and pyrocatechol etchant.

The third interconnect scheme which is preferred comprises using a gold/chrome double layer as the interconnect material. Overlaying layers of chrome, gold and tantalum with thicknesses of approximately 200 Angstroms, 5000 Angstroms and 1000 Angstroms, respectively, are deposited on the front side of the silicon wafer. The chrome layer is adjacent to the silicon surface. The metal interconnect feature is first transferred to the tantalum layer. The wafer is them immersed into the ethylene diamine and pyrocatechol (EDP) etchant bath for the micromachining of the proof mass from the back side of the wafer. The front side of the wafer is protected by the tantalum and gold layers. After the completion of the EDP etch, the metal interconnect feature is transferred to the gold/chrome layer, and the tantalum layer is removed. The wafer is then subjected to hydrofluoric acid etching of the polysilicate glass/silicate glass spacer layer. The gold is resistant to the hydrofluoric acid etch and therefore protects the frontside of the silicon wafer. The chrome is used mainly for the enhancement of adhesion of the gold to the silicon or silicon nitride surface.

The packaging of this resonant bridge accelerometer 10 required a high degree of care due to the high quality factor requirements for this accelerometer 10 during operation. For this reason, it is preferred that the device be vacuum packaged between silicon backing wafers (not shown). Preferably, a silicon to silicon bonding technique is used for packaging the device 10 in this invention. Three different medium materials may be utilized to promote the silicon to silicon bond.

Platinum may be used, wherein platinum silicide is formed so as to bond the device to the silicon backing wafers. The platinum silicide is formed by first depositing an appropriate layer of platinum on the silicon and then exposing the materials to a temperature of about 900° C. in a vacuum or dry nitrogen gas for about 30 minutes. Gold may also be used to form the bond between the device and backing wafers. A gold/silicon eutectic material is formed by first depositing an appropriate layer of gold on the silicon, then exposing the materials to a temperature of about 420° C. in a vacuum for about 15 minutes. Aluminum is another preferred alternative for facilitating the promotion of a bond between the silicon wafers. An appropriate layer of aluminum is deposited on the silicon. The silicon promotes the mutual diffusion of silicon atoms to each of the silicon wafers when heated to approximately 900° C. in a vacuum for about 30 minutes.

The preferred resonant frequency detection scheme for this microaccelerometer 10 comprises the following steps. A one-port detection scheme is utilized. In this mode, a polarization direct current (DC) voltage of approximately 10 volts direct and a drive alternating current (AC) voltage of approximately 10 millivolts are applied between the resonant bridge (14, 16, 18 or 20) and underlying drive electrode 28. This electrostatic force causes a variation of the capacitance between the electrode 28 and the bridge (14, 16, 18 or 20) producing a current. When the system is in forced resonance, i.e., the frequency of the drive voltage coincides with the natural frequency of the bridge (14, 16, 18 or 20), both the capacitance variation and the current are maximized.

Figure 12:
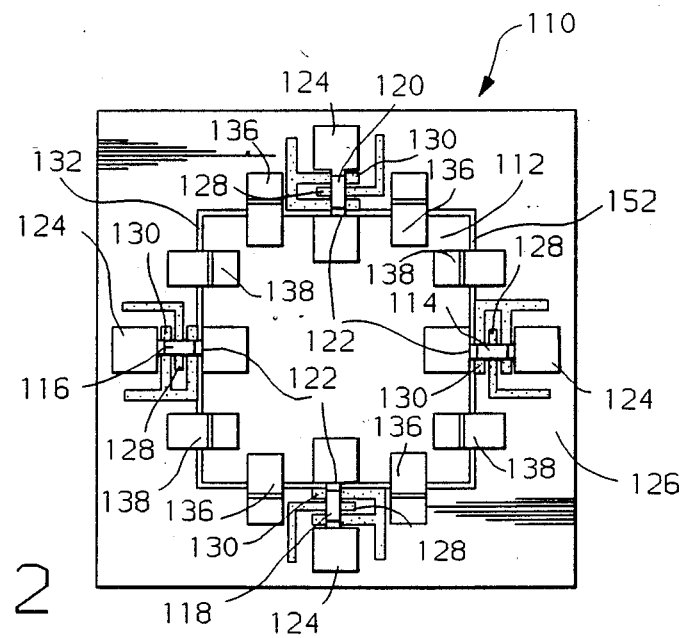
FIG. 12 is a plan view of a preferred resonant bridge two-axis microaccelerometer having mechanical stoppers made in accordance with a preferred embodiment of this invention.

A specific embodiment of this resonant microaccelerometer 110, which has performed successfully, is illustrated in FIG. 12. This microaccelerometer 110 has the following device parameters and is depicted in FIG. 12. The device has a 1.45 milligram proof mass 112 and four resonant bridges (114, 116, 118 and 120) aligned along orthogonal axis through the proof mass 112. The polysilicon resonant bridges (114, 116, 118 and 120) were approximately 250 micrometers long, approximately 100 micrometers wide, and approximately 1.6 micrometers thick. The mechanical stoppers 136 and 138 have the same approximate width and thickness dimensions, however, are not as long as the resonant bridges (114, 116, 118 and 120) since the mechanical stoppers 136 and 138 are cantilevered. The gap between the resonant bridges (114, 116, 118 and 120) and electrodes 128 and 130 was approximately 2 micrometers, therefore, the capacitively coupled area between an individual bridge (114, 116, 118 and 120) and electrode 128 or 130 was about 4000 micrometers square. The polarization voltage was about 10 volts DC and the drive voltage was about 10 millivolts AC. The microaccelerometer 110 was packaged having a vacuum of about 200 milliTorr. To suppress rotation of the proof mass 112, eight silicon constraining bridges (not shown) were formed which were about eight micrometers thick. (An overlaying top layer of Silicon Nitride is not shown in FIG. 12 for clarity of the device.)

The accelerometer 110 was sensitive to acceleration along a given axis of direction of approximately 80 Hz/G. The actual experimental results for the resonant microaccelerometer 110 were consistent with the predicted device response. The measured responses for the resonant microbridges (114, 116, 118 and 120) under no stress, 1G tensile stress and 1G compressive stress corresponded to approximately 174,045 Hz, 174,167 Hz and 174,000 Hz, respectively.

In addition, an advantage of using the one-port electrical detection scheme is that the drive and sense electrodes 128 and 130 may be merged into one electrode, and therefore the bridge length may be reduced. Consequently, the minimum requirement for the bridge (114, 116, 118 or 120) thickness may also be reduced. This permits more area to scale the device 110 dimensions accordingly for different applications.

Although this invention discloses a preferred embodiment suitable for use as a resonant microaccelerometer, it is to be understood that various modifications and changes may be made in construction and use without departing from the spirit of the invention. For this reason, these variations are properly considered within the scope of this invention and, accordingly, the scope of our invention is to be limited only by the following claims.

The embodiments of the invention in which an exclusive property or privilege is claimed are defined as follows:

1. An accelerometer comprising:
   a mass;
   a support surrounding said mass with a gap provided substantially everywhere therebetween said support and said mass;
   at least two bridges attached at one end to said support from which said mass is suspended, said bridges being attached to opposite sides of said mass such that the longitudinal axis through said bridges form a common axis through said mass;
   means for vibrating said bridges at their respective resonant frequencies, their respective resonant frequencies change as a function of extension or compression of said bridges due to acceleration of said mass;
   means for detecting a change in the difference of said resonant frequencies between both of said bridges, so as to provide an indication of acceleration in a direction along said common axis; and
   wherein said means for detection is provided on said support and said bridges span over said means for detection such that a gap exists between said means for detection and said bridges.

2. An accelerometer as recited in claim 1 wherein said bridges are excited to vibrate at their respective resonant frequencies using electrostatic means.

3. An accelerometer as recited in claim 2 wherein said electrostatic means include a drive electrode provided on said support, said drive electrode is centrally located along the longitudinal axis of its respective bridge and a gap is provided therebetween said drive electrode and said respective bridge.

4. An accelerometer as recited in claim 2 wherein the electrostatic means comprise:
 a drive electrode for each of said bridges, each drive electrode positioned across a gap from each of said respective bridges;
 at least one sense electrode for each bridge, each of said sense electrodes positioned on said support adjacent to said drive electrode for said respective bridge, thereby a gap is provided therebetween said bridge and said sense and drive electrodes, vibration of said bridge producing a time-varying capacitance across its respective gap; and
 a feedback vibration-detection circuit for each of said bridges connected to said drive electrode and said sense electrodes for said respective bridge, the circuit sensing through said sense electrode changes in the time varying capacitance of said respective bridge and thereby sensing changes in the vibration of said bridge and the circuit applying voltage to the drive electrodes as a function of the sensed changes in capacitance.

5. An accelerometer as recited in claim 4 wherein said means for measuring include a frequency measuring circuit for each bridge connected to the feedback vibration detection circuit of the respective bridge.

6. An accelerometer as recited in claim 1 wherein said bridges are resonated by an electromechanical oscillator.

7. An accelerometer as recited in claim 1 wherein said bridges are under compressive stress.

8. An accelerometer as recited in claim 1 further comprising a plurality of stops to prevent deflection of said mass past a predetermined distance in a direction perpendicular to the top surface of said mass.

9. An accelerometer as recited in claim 8 wherein at least one of said stops is attached to said mass and at least one of said stops is attached to said support.

10. An accelerometer as recited in claim 1 further comprising a plurality of constraining arms attached to said mass to suppress the rotation of said mass and to suppress the deflection of said mass in a direction perpendicular to the top surface of said mass.

11. An accelerometer as recited in claim 1 wherein four bridges suspend said mass, two bridges forming a common first axis through said mass, the other two bridges forming a common second axis through said mass perpendicular to said first axis, the change in difference in resonant frequencies between said two bridges of said first axis providing an indication of a component of acceleration along said first axis at the same time the change in difference in resonant frequencies between the other two bridges provide an indication of an orthogonal component of acceleration along said second axis.

12. An accelerometer as recited in claim 11 further comprising a plurality of stops to prevent deflection of said mass past a predetermined distance in a direction perpendicular to the top surface of said mass.

13. An accelerometer as recited in claim 12 wherein at least one of said stops is attached to said mass and at least one of said stops is attached to said support.

14. An accelerometer as recited in claim 1 wherein the means for measuring include a frequency measuring circuit for each bridge.

15. An accelerometer comprising:
 a mass centrally positioned within a support with a gap substantially everywhere therebetween said mass and said support,
 at least two pairs of bridges for suspending said mass from said support, said bridges spanning over said gap between said mass and said support, each pair of said bridges having a first bridge with one end attached to one side of said mass and a second bridge attached to an opposite side of said mass and respective opposite ends of said first and second bridges attached to said support such that said first and second bridges form a common longitudinal axis through said mass, the formed axes of the two pairs of bridges being perpendicular to each other;
 a drive electrode for each bridge provided on said support, each drive electrode positioned such that a gap exists everywhere therebetween said respective bridge which spans over said drive electrode;
 a pair of sense electrodes for each bridge provided on said support, one sense electrode positioned adjacent to one side of the drive electrode and the other sense electrode positioned adjacent to an opposite side of the drive electrode, said pair of sense electrodes positioned such that a gap exists everywhere therebetween said respective bridge which spans over said drive and sense electrodes, vibration of said bridges producing a time varying capacitance across said gap;
 a feedback vibration detection circuit for each of said bridges connected to said drive electrodes and said pair of sense electrodes for each of said respective bridges, the circuit sensing through the pair of sense electrodes senses changes in the time varying capacitance and thereby the changes in vibration of said respective bridges, and the circuit causes the drive electrode to exert a force on said respective bridge as a function of the sensed changes in vibration to maintain vibration of each respective bridge at the respective resonant frequency;
 a plurality of stops to prevent deflection of said mass past a predetermined distance in a direction perpendicular to said common two axes, wherein one of said stops is attached to said mass and one of said stops is attached to said support;
 a plurality of constraining bridges attached to said mass to suppress rotation of said mass and to suppress displacement of said mass in a direction perpendicular to said two axes; and
 means for simultaneously measuring in each pair of bridges a change in the difference of said resonant frequencies between said first and second bridges of said pairs to provide an indication of acceleration in a direction along the respective common axes formed by said pair of bridges, the simultaneous measuring of said pairs providing an indication of orthogonal components of acceleration, said resonant frequency of each of said bridges changing as a function of extension or compression of said bridge due to acceleration of said mass.

16. A method for fabricating a monolithic accelerometer comprising the steps of:

forming drive and sense electrodes with a first structural layer on one side of a substrate;

forming a body of a predetermined mass in said substrate, symmetrically aligned with said drive and sense electrodes;

depositing a sacrificial layer over said drive and sense electrodes;

forming bridges over said sacrificial layer;

removing said sacrificial layer to form a gap therebetween said bridges and said drive and sense electrodes; and substantially isolating said mass from said substrate so as to suspend said mass from said bridges, and so as to minimally attach said mass to said substrate with a plurality of constraining bridges.

17. A method for fabricating a monolithic accelerometer as recited in claim 16 further comprising the steps of:

depositing a sacrificial layer over regions of said support and of said body of predetermined mass;

forming stops over said sacrificial layer; and removing said sacrificial layer to form a stop which is attached to said support and said body of mass and which extends over said body of mass and said support for a predetermined distance.

* * * * *